FIG. 2  CONVENTIONAL DASHPOT DAMPER
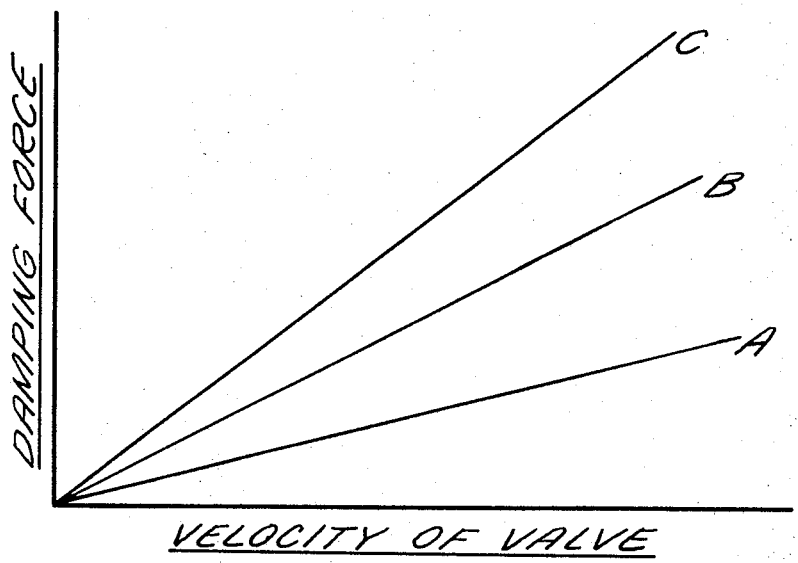
FIG. 3  CONVENTIONAL ORIFICE DAMPER
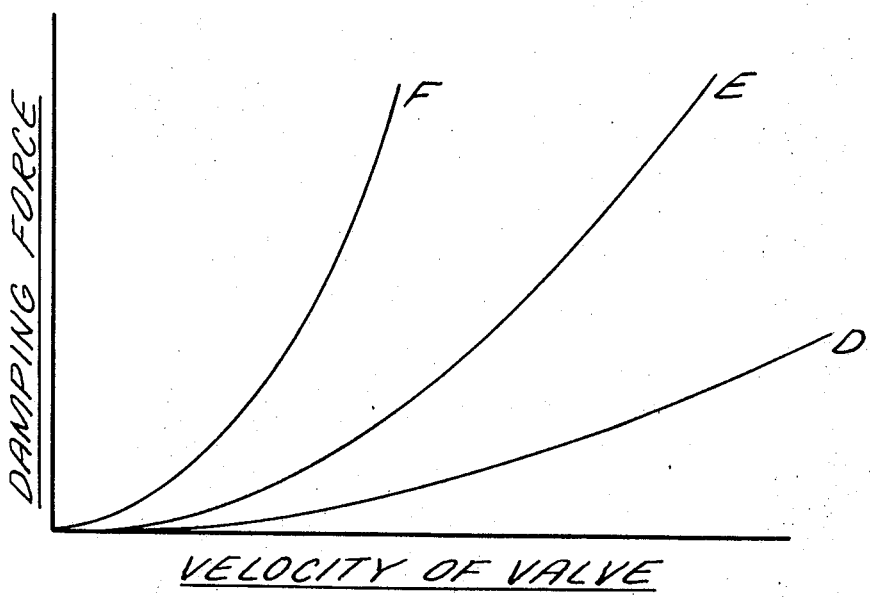

United States Patent Office 3,517,681
Patented June 30, 1970

3,517,681
VISCOSITY INDEPENDENT PRESSURE REGULATING VALVE
Bartholomew J. Davison, Simsbury, Conn., assignor to United Aircraft Corporation, East Hartford, Conn., a corporation of Delaware
Filed May 23, 1968, Ser. No. 731,380
Int. Cl. F16k 31/12
U.S. Cl. 137—505.18    1 Claim

ABSTRACT OF THE DISCLOSURE

Damping of a spool valve in a hydraulic pressure regulator is accomplished by disposing a variable volume chamber at one end of the spool valve which is between and in communication with the regulated pressure and drain pressure. A set of sharp-edged orifices is located in the communicating conduits and damping of the valve is obtained by forcing incompressible fluid through the orifices thereby restricting the flow to provide damping which is relatively independent of fluid viscosity. Continual, steady state, turbulent fluid flow through the chamber occurs due to the drain of fluid from the chamber.

BACKGROUND OF THE INVENTION

This invention relates to pressure regulators for hydraulic systems and in particular relates to high response pressure regulating valves. Specifically, the invention relates to a device for generating a damping force on the regulating valve which is essentially independent of changes in temperature of the operating fluid and is therefore relatively insensitive to changes in the viscosity of the operating fluid.

In the prior art, it is customary to damp the hydraulic actuated valves by conventional dashpot dampers which are inherently inaccurate inasmuch as damping varies directly with fluid viscosity. Typically, regulated pressure is fed to a dead-ended chamber located at one end of the valve. The pressure in the dead-ended chamber works against a spring force at the other end of the valve resulting in the valve regulating the supply pressure. When damping is required on these valves, the flow into and out of the dead-ended chamber is restricted through the use of a small diameter line to the dead-ended chamber. In devices subject to extreme temperature variations, such as fuel controls for jet aircraft, these dampers have proven to be unsatisfactory because the viscosity of the operating fluid is subject to wide variations. Conventional dashpot dampers, being viscosity sensitive, are unsatisfactory because such conditions cause variation in speed of response and instability problems in the hydraulic actuator valves. Because of viscosity effects, a valve with a dashhpot damper designed for a particular temperature and fluid viscosity would become unstable when the viscosity is reduced because of increased temperature. Similarly, if the temperature of the fluid is reduced, thereby increasing the viscosity of the fluid, this same valve would become too slow due to the increased damping force. Thus, the conventional dashpot damper has certain limitations which become intolerable for many present day applications.

Another conventional damper is an orifice damper which is considered to be an improvement over the conventional dashpot damper. In the orifice damper the line to the dead-ended chamber at the base of the valve is provided with an orifice restriction. The orifice causes the hydraulic flow into and out of the dead-ended chamber to be turbulent. The orifice damper becomes objectionable because the damping force versus velocity of the valve curve becomes nonlinear. The disadvantage of the nonlinearity of the damping force curve for the typical dead-ended chamber orifice damper, stems from the fact that a valve which has some damping at the null position becomes too slow or sluggish at high valve velocities. Further, when a valve design has the proper damping for high valve velocities, the damping forces near the null position are so low as to preclude damping and results in valve instability near the null position.

I have found that I can obviate the problems noted above by providing a damper such that the damping curve can be made to approximate a straight line and to provide damping which is relatively insensitive to large viscosity changes in the operating fluid. My invention combines a drain conduit with a sharp edge orifice restriction with the conventional orifice damper scheme. In this arrangement, the chamber at one end of the valve is no longer dead-ended and fluid flow to a low pressure reservoir is allowed during steady state operation. The incorporation of my invention into a conventional orifice damper effectively shifts the damping force versus velocity of the valve curve to provide a high average slope of the curve near the null position. As a result the valve becomes stable near the null position and valve response is rapid due to the gradual slope changes in the damping force curve.

SUMMARY OF INVENTION

A feature of this invention is the generation of a damping force which is relatively independent of viscosity changes in the fluid flow.

Another feature of this invention is the provision of improved orifice damping means for rotating or nonrotating spool-type valves which are well known in the art.

A further feature of this invention is the provision of a downstream pressure regulator for use with incompressible fluids which provides rapid response, stability near null position and incorporates damping which is relatively independent of changes in the fluid viscosity.

A still further feature is the provision of damping on a hydraulic downstream pressure regulator to supply a constant regulated pressure from a supply pressure which may fluctuate over a wide range during operation.

BRIEF DESCRIPTION OF THE DRAWING

Other features and advantages will be apparent from the specification and claim, and from the accompanying drawings which illustrate a preferred embodiment of the invention.

FIG. 2 is a graphic representation of the damping forces associated with conventional dashpot dampers.

FIG. 3 is a graphic representation of the damping forces associated with orifice dampers having a dead-ended chamber.

DESCRIPTION OF THE PREFERRED EMBODIMENT

Figure 1:
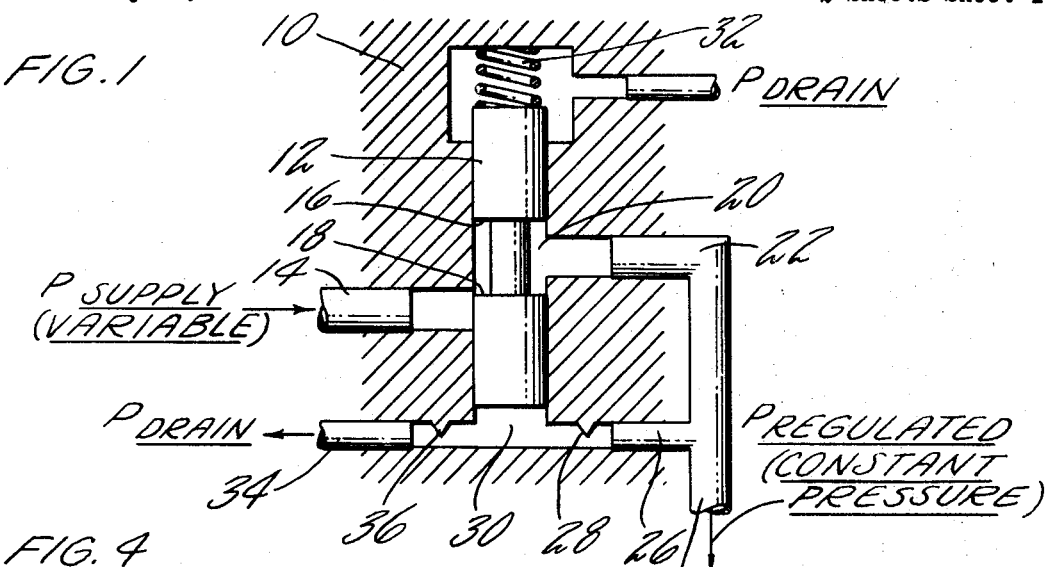
FIG. 1 is a schematic illustration of a downstream pressure regulator incorporating the subject matter of this invention.

Referring to FIG. 1, a downstream pressure regulator is shown having a housing 10 and spool valve 12. The spool valve shown is nonrotating but can be the rotating type which is well known in the art. Conduit 14 supplies high pressure incompressible fluid (liquid) to the regulator. The pressure of the supply fluid may fluctuate widely with the system operating conditions and, if not regulated, would interfere with the sensitive control systems that sense the regulated pressure. The spool valve 12 contains metering lands 16 and 18 which define with the housing an annulus 20 which serves to collect the regulated supply pressure and conduct the regulated supply pressure to outlet conduit 22. The outlet conduit 22 connects to conduit 24 which supplies a constant regulated pressure to the various control systems. Branch conduit 26 supplies a force feedback to the spool valve 12 past an orifice restriction 28 to the chamber 30 at the end of the spool valve. It is apparent that the position of the spool valve is basically dependent upon the modulated pressure in chamber 30 and the force generated at the opposite end of the spool valve by spring 32 which biases the spool valve in the open direction. A drain conduit 34 is provided to vent chamber 30 thereby allowing a steady state flow from the regulated pressure conduit 22 through chamber 30 to the drain cavity. The drain conduit 34 is also provided with an orifice restriction 36. Steady state flow is defined herein to mean the flow of fluid through conduits 26 and 34 when the valve velocity is zero.

Orifices 28 and 36 may be conventional sharp edge orifices, thin plates, or any similar device or restriction which would assure that the flow through the restriction is turbulent.

An explanation of the damping force associated with the conventional dashpot damper will be helpful in understanding my invention. The damping force of a conventional dashpot damper is shown graphically on FIG. 2. The conventional dashpot damper can be described as a dead-ended chamber at the end of the valve to be damped where the regulated pressure is fed back to the chamber through a small diameter conduit. The practical effect of the small diameter conduit is to restrict the flow into and out of the chamber in damping fashion. In this situation the flow is laminar and the damping force versus velocity of the valve curve is linear. Line A represents the damping force associated with the dashpot damper where the viscosity is low. Curves B and C represent the effect of increased viscosity on the damping force. Substitution into the Hagen-Poiseuille Law provides the formula for damping force:

$$F = \frac{128 \mu l}{\pi d^4} \left( \frac{\pi D^2}{4} \right)^2 V$$

where

F=the damping force on the valve
$\mu$=the fluid viscosity
$l$=the length of the small diameter conduit
$d$=the diameter of the small diameter conduit
D=the diameter of the valve
V=the velocity of the valve.

Damping is usually recognized in terms of the slope of the curve on FIG. 2. Thus, damping is constant for a dashpot damper configuration for a given viscosity.

Curve B in FIG. 2 represents the same dashpot damper as depicted by curve A where the fluid viscosity is twice that of curve A. Similarly, curve C represents the same dashpot damper as depicted by curve A where the fluid viscosity is three times that associated with curve A. The magnitudes of changes in operating conditions in aircraft fluid control systems may cause viscosity variations as great as 25:1. Thus a damper designed for one operating condition may be ineffective at another operating condition.

The damping force associated with conventional orifice damping is shown on FIG. 3. Orifice damping, as stated, is a modification of the conventional dashpot damping scheme. The chamber 30 in a typical orifice damper is dead-ended so that there is no steady state flow out of the chamber 30 since no drain conduit 34 is provided on the conventional orifice damper. The application of Bernoulli's equation to the orifice damper, where the flow is turbulent and incompressible, yields the formula for damping force:

$$F = \left[ \frac{\gamma}{2g} \left( \frac{D}{d} \right)^4 \left( \frac{\pi D^2}{4} \right) \right] V^2$$

where

F=the damping force on the valve
$\gamma$=the fluid sepecific weight
D=the diameter of the valve
$d$=the diameter of the orifice opening
V=the velocity of the valve.

The disadvantage of this type of system is pictorially shown on FIG. 3.

As previously stated, damping is ordinarily recognized as the slope of the curve. Thus the formula for damping is:

$$\text{Damping} = \frac{dF}{dV} = \left[ \frac{\gamma}{g} \left( \frac{D}{d} \right)^4 \left( \frac{\pi D^2}{4} \right) \right] V$$

It is seen that the damping or slope of the curve is nonlinear but is independent of fluid viscosity. Nonlinearity is unacceptable for many applications.

Curves D, E and F on FIG. 3 represent the performance of conventional orifice dampers for various diameters and are a ratios. These curves are independent of viscosity and an analysis of curves D and F will exemplify the disadvantages of typical orifice dampers. Curve D represents an orifice damper design which has very little damping force slope near the null position resulting in an unstable valve near the null position. At the same time curve D has adequate damping in the high valve velocity region allowing proper valve response to significant velocity variations. Curve F also has certain disadvantages since the curve is initially very flat near the null position permitting a slight amount of valve instability. This instability may be tolerable since damping increases rather rapidly near the null position. However, when a significant pressure variation occurs and the velocity of the valve is high, the slope of the damping force associated with curve F increases so rapidly as to create a very slow or sluggish valve response. It becomes apparent that the ideal or preferred damping force versus velocity of the valve performance curve would approach that of a straight line and would be insensitive to viscosity changes.

Figure 4:
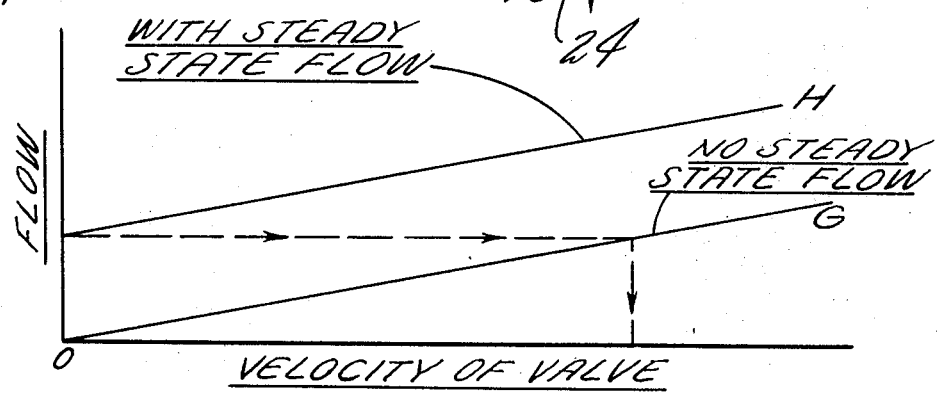
FIG. 4 is a graphic representation of the flow for a conventional orifice damper and the effect of steady state flow.
Figure 5:
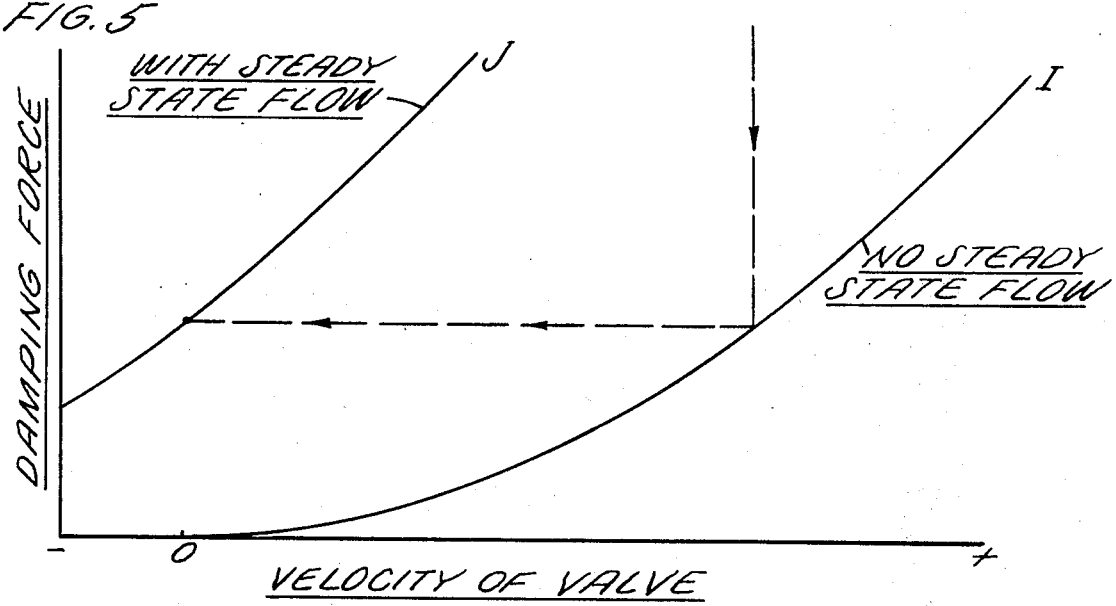
FIG. 5 is a graphic representation of damping force for a conventional orifice damper and shows the effect of steady state flow.

Inspection of FIGS. 4 and 5 reveals the effect of steady state fluid flow from the normally dead-ended chamber on a conventional orifice damper. Line G represents the flow through conduit 26 into chamber 30 for a conventional orifice damper when the chamber 30 is dead-ended. It is apparent that this curve has no steady state flow when the valve is not moving and hence the curve passes through the zero velocity and zero flow point. The flow curve is raised by adding downstream conduit 34 with a restriction 36 to the conventional orifice damper. The shift depends upon the size of the orifices selected. Curve H represents the flow through conduit 26 associated with steady state flow.

Damping force curves I and J correspond with the flow curves G and H, respectively. The conventional orifice damper curve I performance line has a low average slope near the null point which results in undesirable instability near the null point. Curve J, however, is associated with steady state flow (flowing orifices) and does not have a flat near the null position. Hence, permitting steady state flow provides a damping force performance curve which provides damping near the null position and at the same time does not overdamp the valve or cause the valve to become too slow or sluggish. The shifting of curve I over to position J is caused by the flowing of fluid out of the chamber. This shift is graphically presented by the dashed line and arrows on FIGS. 4 and 5.

Curve J represents the performance of a flowing orifice's damper which has a high average slope near the null position. It is apparent that this curve does not intercept the zero/zero position. The curve can be adjusted downward by calibration of the valve. Downward adjustment can be accomplished by decreasing the spring force or by providing an external adjustment to trim the spring loading. It should be recognized that the foregoing analysis pertains to the situation where the valve is moving upward.

If the valve were to move in the downward direction, the valve velocity would be negative. It is important to recognize that the conventional orifice curve must be shifted so that the low average slope region of the curve is effectively eliminated from the valve operating range and the damping force curve approaches a straight line. In the negative velocity region, the average slope (i.e. damping) is still high assuring rapid response and stability.

The use of this invention provides a downstream pressure regulator which can regulate widely varying pressures and provide damping over a wide range of viscosity variations.

As a result of this description and the accompanying drawings, it is apparent that an improved downstream pressure regulator has been provided having particularly novel damping provisions. Although a preferred embodiment of this invention has been illustrated, it is apparent that various other changes to and applications for this arrangement can be made without departing from the scope of this invention.

What is claimed is:
1. A downstream regulator valve comprising:
   a regulator housing having a cylindrical chamber formed therein;
   an inlet for receiving a supply of high pressure liquid communicating with said chamber;
   an outlet communicating with said chamber having a regulated pressure conduit connected thereto;
   a spool valve element in said chamber mounted for movement to control flow from said inlet to said outlet in response to sensed pressure changes in a variable volume chamber formed by one end of the valve element and the cylindrical chamber;
   a spring in the other end of the chamber biasing said spool valve in an open direction;
   a branch conduit communicating said variable volume chamber with said discharge conduit;
   a drain conduit continuing said branch conduit connecting said variable volume chamber with a low pressure reservoir; and
   sharp-edge orifice restriction means located in the branch conduit and in the drain conduit permitting steady state turbulent flow of liquid into and out of the variable volume chamber to provide damping of the valve that is relatively insensitive to viscosity changes in the liquid.

References Cited
UNITED STATES PATENTS

| | | | |
|---|---|---|---|
| 2,196,279 | 4/1940 | Thomas | 137—505.22 XR |
| 2,858,700 | 11/1958 | Rose | 137—100 XR |
| 2,881,793 | 4/1959 | Lee | 137—501 |
| 2,902,047 | 9/1959 | Tavener | 137—505.18 |
| 3,174,505 | 3/1965 | Bauer | 137—505.18 |
| 2,739,607 | 3/1956 | Murray | 137—514.5 XR |
| 3,123,094 | 3/1964 | Toschkoff | 251—50 XR |

HAROLD W. WEAKLEY, Primary Examiner

U.S. Cl. X.R.

137—505.22, 505.23; 251—50